Feb. 11, 1930.  M. F. BRENNAN  1,746,518
WINDOW PORTAL
Filed Jan. 16, 1929
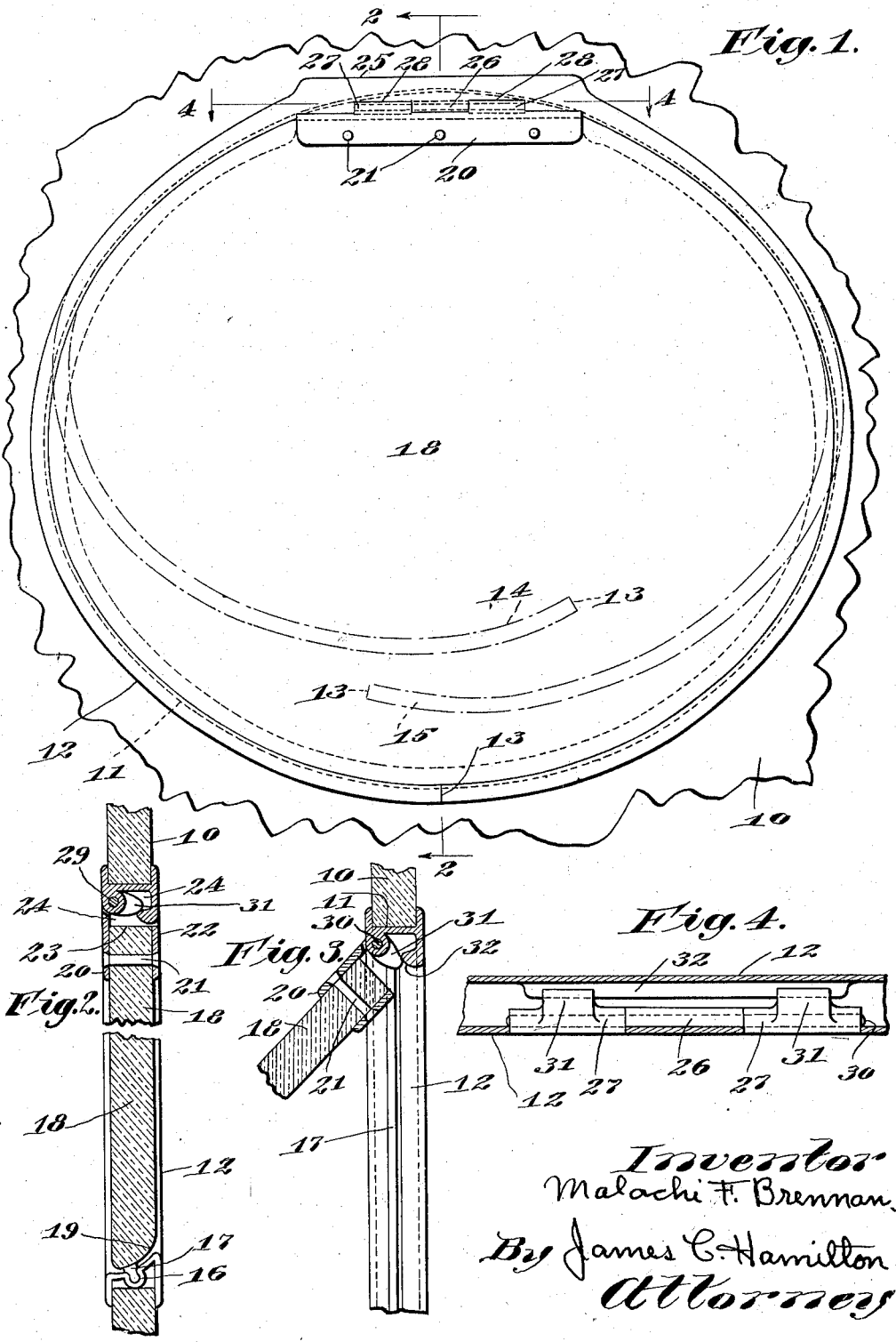

Patented Feb. 11, 1930

1,746,518

UNITED STATES PATENT OFFICE

MALACHI F. BRENNAN, OF WOLLASTON, MASSACHUSETTS, ASSIGNOR OF ONE-HALF TO W. J. BUCKLEY, OF WOLLASTON, MASSACHUSETTS

WINDOW PORTAL

Application filed January 16, 1929. Serial No. 332,772.

My present invention relates to portals, and more particularly to window portals to be used in places where the glass comprising such window may be raised or lowered in a frame such as the plate glass window of a closed automobile.

Heretofore in closed automobiles, it has been necessary to drop the window whenever the driver desired to signal with his hand, the direction in which he proposed to travel, or to warn vehicles behind him of his intention to stop.

In most instances the driver of an automobile leaves his window partially open for this purpose, even when it would be desirable to have it closed, as in the case of a real cold day or a bad rainstorm.

Having in mind the needs of an easily operated portal in the window of an automobile, as well as other similar uses, I have designed a portal that can be easily inserted in a window and as easily removed and replaced when by cause of breakage a new portal might be desired. Of course I am aware that the broad idea of a portal is old, but I believe that the new features incorporated in my improved portal are new and of considerable utility, particularly in the motive vehicle industry.

My principal object therefore is an improved window portal.

Another object is a portal readily removed or replaced, as the case may be.

Still another object is a portal which will remain open or closed at the option of the operator and at the same time require no outstanding projections such as handles, knobs, and the like.

Further objects and novel features constituting the construction and operation of my invention will appear as the description of the device progresses.

Referring to the drawings:

Fig. 1 is a side elevation of the portal mounted in a pane of glass such as the movable window of an automobile, and shows such portal in a closed relation with respect to such window which has been broken away for convenience;

Fig. 2 is a vertical cross section taken on the line 2—2 of Fig. 1, and showing the relative position of the different parts to each other when the portal is closed, the central portion of which is broken away, and the scale of which is approximately double that of Fig. 1;

Fig. 3 is a cross section showing the upper portion of Fig. 2 swung outward in an open position, and Fig. 4 is a plan section taken on the line 4—4 of Fig. 1, the ends of which have been broken away and the scale of which corresponds to Figs. 2 and 3.

Referring again to the drawing like reference characters referring to corresponding parts throughout, 10 designates a pane of glass in which is provided an opening 11 preferably of oval shape, the minor axis of which lies in a vertical plane. A rim 12 is provided of substantially U formation, being bisected at the lowermost point and centred on the minor axial line as indicated at 13, the purpose of which is to allow for contraction of rim 12 when inserting same in the opening 11 in the glass 10, the contraction of which is illustrated in Fig. 1 by the numerals 14 and 15.

Preferably the rim 12 is constructed from a spring material such as steel or spring brass such that its normal shape before insertion in the opening 11 is considerably extended thereby providing a spring retention on the opening 11 when contracted and snapped into place as shown in Fig. 1 of the drawings.

A recess 16 extends around the inner surface of the rim 12 terminating at a point adjacent the two sides of the hinge portion located at top of rim 12, and an insert of resilient material 17 is provided, the composition of which is preferably soft rubber, to provide cushioning means for the portal glass 18. The exterior surface of the recess 16 acts as a stop and rest against the edge of the opening 11 in the window pane 10, and the inner surface of the rim 12 is slightly concaved having an inner diameter slightly smaller than the outer diameter, thereby presenting a concaved bevel adapted to correspond to the convexed curve 19 of the glass 18 extending around the inner edge of the portal glass 18 and terminating at a point adjacent either side of a hinge portion 20 attached to the upper side of the portal glass 18 by means of rivets 21 provided therefor, together with a clamping strip of metal 22 located on the opposite side of portal glass 18.

The upper surface 23 of the portal glass 18 is flattened to provide a space 24 between such portal glass 18 and the inner surface of the rim 12 in which is located the hinge members hereinafter described.

The upper exterior edge of the rim 12 is flattened at 25 over an area corresponding to the width of the hinge member 20 and constitutes the central hinge portion 26. A right and left hinge portion 27 formed on the upper edge of the hinge portion 20 are adapted to fit into recesses 28 located in the upper exterior portion of the rim 12. Both the hinge portions 26 and 27 are provided with a central bore 29 through which is inserted a pivot 30 for the purpose of pivoting the portal hinge plate 20 to the upper portion of the rim 12. On the inner side of each of the hinge members 27 is located an outstanding cam member 31 which is solidly attached thereto, and adapted to engage a horizontally disposed offset member 32 formed on the lower edge of the inner top portion of the rim 12.

When the cam 31 is in a closed position as shown in Fig. 2, the offset member 32 bears up against the under side of the cam 31 and by reason of the spring characteristic present in the side of the rim 12, provides a tension adapted to maintain the portal glass in a closed position and in contact on its edge with the resilient insert 17 located on the inner surface of rim 12.

If it is desired that the portal be opened, the operator presses against the glass 18 with his hand, causing the cam 31 to bend the offset member 32 inward toward him an amount sufficient for the cam 31 to pass by, at which time the offset member 32 springs back into normal position, as shown in Fig. 3, and thereby provides a stop for the opposite side of cam 31, to the effect that the portal glass 18 will remain open of its own accord.

To close the portal glass 18, the operator simply pulls the edge of the glass 18 toward himself until the cam 31 passes over the offset member 32 at which time the offset member 32 exerts sufficient pressure on the under side of cam 31 to close and hold such portal glass 18 in contact with the insert 17 without further effort on the part of the operator.

The rim 12 is of relatively thin construction and will not interfere with the raising or dropping of a window frame in a closed automobile, or similar frame; the glass 18 may be left open as shown in Fig. 3 for ventilation purposes and will deflect rain which would not be possible in the case of an open window.

Having thus described my invention, what I claim as new, is:

1. In a window portal, a U shaped rim adapted to fit an opening in a window pane, said rim composed of a top section comprising one half of a hinge on one side of said rim, and a downwardly extended horizontally disposed cam member located on the opposite side of said rim adjacent said hinge portion, said rim being split transversely on one side and further provided with a recess extending in opposite directions from said transverse split to a point adjacent the ends of said hinge portion and located approximately in the centre of said U shaped member, a portal cover comprising a disk of transparent material provided at the top thereof with a hinge portion adapted to engage the said hinge portion in said rim and be maintained by means of a pivotal pin, said hinge member on said portal cover further provided with inwardly disposed cam member adapted to engage with said downwardly extended cam member on said rim for the purpose of maintaining the portal cover in closed relation with said rim, and to provide a stop for said portal cover cam when said cover is in an open position.

2. In a portal for window panes and the like, the combination of a split rim adapted to fit over an opening in said window, a cover adapted to hinge at one side of said rim, cam members on said rim and cover adapted to co-act to provide a cam toggle lock between said rim and said portal cover, to maintain said cover in a closed relation with said rim and to provide a stop to maintain said cover in an open relation with said rim, substantially as shown and described.

In witness whereof, I hereby subscribe my name this 19th day of December, 1928.

MALACHI F. BRENNAN.